United States Patent
Grasso

(10) Patent No.: US 11,136,958 B2
(45) Date of Patent: Oct. 5, 2021

(54) SWALLOW TAIL AIRFOIL

(71) Applicant: STICHTING ENERGIEONDERZOEK CENTRUM NEDERLAND, Petten (NL)

(72) Inventor: Francesco Grasso, Petten (NL)

(73) Assignee: NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 129 days.

(21) Appl. No.: 15/877,160

(22) Filed: Jan. 22, 2018

(65) Prior Publication Data
US 2018/0238298 A1 Aug. 23, 2018

Related U.S. Application Data

(63) Continuation-in-part of application No. 14/419,572, filed as application No. PCT/NL2013/050575 on Aug. 2, 2013, now Pat. No. 9,897,067.

(30) Foreign Application Priority Data

Aug. 6, 2012 (NL) .................................... 2009286

(51) Int. Cl.
F03D 1/06 (2006.01)
F03D 7/02 (2006.01)
B64C 3/14 (2006.01)

(52) U.S. Cl.
CPC .............. *F03D 1/0641* (2013.01); *B64C 3/14* (2013.01); *F03D 7/024* (2013.01); *F03D 7/0232* (2013.01);
(Continued)

(58) Field of Classification Search
CPC .... F03D 1/0633; F03D 1/0641; F03D 1/0675; F03D 1/0683; F03D 7/024; F03D 7/0232;
(Continued)

(56) References Cited

U.S. PATENT DOCUMENTS 2,562,227 A * 7/1951 Zobel ...................... B64C 21/08
244/35 R
3,042,371 A * 7/1962 Fanti ...................... F04D 29/368
416/132 R
(Continued)

FOREIGN PATENT DOCUMENTS

CN 102094769 A 6/2011
CN 102171097 A 8/2011
(Continued)

OTHER PUBLICATIONS

English machine translation of KR-10-1434469-B1, Oct. 23, 2019.*
(Continued)

*Primary Examiner* — Christopher Verdier
(74) *Attorney, Agent, or Firm* — Nixon & Vanderhye

(57) ABSTRACT

Aerodynamic element having a cross section in an airflow direction with a suction side surface, a pressure side surface, and a trailing edge extending between the suction side surface and the pressure side surface. The aerodynamic element further comprises an extension body attached to the trailing edge near the suction side surface of the aerodynamic element. A top surface of the extension body is flush with the suction side surface. The aerodynamic element (10) is e.g. applied in a rotor blade for a wind turbine.

7 Claims, 3 Drawing Sheets

(52) U.S. Cl.
CPC ... *B64C 2003/147* (2013.01); *F05B 2240/301* (2013.01); *F05B 2250/712* (2013.01); *Y02E 10/72* (2013.01)

(58) Field of Classification Search
CPC ................. F05B 2240/301; B64C 3/14; B64C 2003/147; B64C 2003/148; B64C 3/28; B64C 11/18; B64C 21/00; B64C 21/02; B64C 2230/20; B64C 2230/28; B64C 21/08; B64C 2230/00; B64C 2230/04; B64C 2230/06; B64C 2230/08; Y02T 50/12; Y02T 50/16; Y02T 50/166; Y02E 10/721; Y02E 10/72; Y02E 50/10; Y02E 50/30
USPC .... 416/23, 24, 228, 235, 236 R, 237, 231 B, 416/223 R
See application file for complete search history.

(56) References Cited

U.S. PATENT DOCUMENTS

| | | | | |
|---|---|---|---|---|
| 5,294,080 | A * | 3/1994 | Ross | B64C 9/14 244/215 |
| 5,738,298 | A * | 4/1998 | Ross | B64C 7/00 244/1 N |
| 7,946,803 | B2 | 5/2011 | Wobben | |
| 9,897,067 | B2 * | 2/2018 | Grasso | F03D 1/0641 |
| 2006/0102801 | A1 * | 5/2006 | Manley | B64C 21/08 244/208 |
| 2007/0034746 | A1 * | 2/2007 | Shmilovich | B64C 21/04 244/207 |
| 2007/0158503 | A1 * | 7/2007 | Burg | B63B 1/248 244/215 |
| 2007/0224029 | A1 * | 9/2007 | Yokoi | F03D 3/005 415/4.2 |
| 2009/0104038 | A1 * | 4/2009 | Grabau | F03D 1/0641 416/219 R |
| 2009/0263252 | A1 * | 10/2009 | Slot | F03D 1/0641 416/223 R |
| 2010/0028161 | A1 * | 2/2010 | Vronsky | F03D 1/0641 416/238 |
| 2010/0215493 | A1 * | 8/2010 | Abdallah | F03D 7/0232 416/23 |
| 2011/0248122 | A1 | 10/2011 | Schlipf et al. | |
| 2013/0094970 | A1 * | 4/2013 | Fukami | F03D 1/0633 416/223 R |
| 2013/0259689 | A1 * | 10/2013 | Eisenberg | F03D 1/0633 416/23 |

FOREIGN PATENT DOCUMENTS

| | | | | |
|---|---|---|---|---|
| EP | 0 234 768 | A2 | 9/1987 | |
| EP | 1757806 | A1 | 2/2007 | |
| EP | 2604856 | A1 | 6/2013 | |
| IT | BZ 20070021 | A1 | 11/2008 | |
| KR | 10-1434469 | B1 * | 8/2014 | .......... Y02E 10/721 |
| WO | 2009/030113 | A1 | 3/2009 | |
| WO | WO-2010/040501 | A2 * | 4/2010 | ............... B64C 9/24 |

OTHER PUBLICATIONS

John Keaton et al.: "Transonic Cascade Measurements to Support Analytical Modeling", Sep. 30, 2007, No. Afosr Grant FA9550-05-1-0183 Sep. 30, 2007 (Sep. 30, 2007), pp. 1-55, XP007922324, Retrieved from the Internet: URL:http://oai.dtic.mil/oai/oai?verb=getRecord&metadataPrefix=html&identifier=ADA485127 [retrieved on Oct. 15, 2013] figure 6.

Do T et al.: "Numerical study of turbulent trailing-edge flows with base cavity effects using URANS", Journal of Fluids and Structures, Academic Press, Amsterdam, NL, vol. 26, No. 7-8, Oct. 1, 2010 (Oct. 1, 2010), pp. 1155-1173, XP027503591, ISSN: 0889-9746, DOI: 10.1016/J.JFLUIDSTRUCTS.2010.07.006 [retrieved on Oct. 1, 2010] figure 1 tables 1,5 paragraph [03.4].

J. F Olsen et al.: "Vortex shedding behind modified circular cylinders", Journal of Wind Engineering and Industrial Aerodynamics, vol. 86, No. I, May 1, 2000 (May 1, 2000), pp. 55-63, XP055060639, ISSN: 0167-6105, DOI: 10.1016/S0167-6105(00)00003-9 figure 1 p. 2.

J. P. Baker et al.: "Drag Reduction of Blunt Trailing-Edge Airfoils", Department of Mechanical and Aeronautical, Blunt trailing edge, Drag reduction, Airfoil, CFD, Experiment, BBAA VI International Colloquium on: Bluff Bodies Aerodynamics & Applications Milano, Italy, Jul. 20-24, 2008.

Van Dam et al.: "Trailing Edge Modifications for Flatback Airfoils", Sandia is a multiprogram laboratory operated by Sandia Corporation, a Lockheed Martin Company, for the United States Department of Energy's National Nuclear Security Administration under Contract DE-AC04-94AL85000.Prepared by Sandia National Laboratories Sandia Report SAND2008-1781 Unlimited Release Printed Mar. 2008.

International Search Report, dated Oct. 23, 2013, from corresponding PCT application.

Chinese Office Action issued in Application No. 201380041923.5, dated Dec. 21, 2016, with English Translation.

Nov. 14, 2017, EP communication issued for related EP application No. 13747895.4.

* cited by examiner

SWALLOW TAIL AIRFOIL

This application is a continuation in part of U.S. Ser. No. 14/419,572 filed Feb. 4, 2015. U.S. Ser. No. 14/419,572 was a 371 of international application PCT/NL2013/050575 filed Aug. 2, 2013, claiming priority to NL 2009286 filed Aug. 6, 2012.

FIELD OF THE INVENTION

The present invention relates to an aerodynamic element, e.g., for a wind turbine rotor blade, having a cross section in an airflow direction with a trailing edge of the flat-back airfoil (or blunt trailing edge) type. The aerodynamic element may also be provided in other applications, such as wing bodies, etc. In a further aspect, the present invention relates to a rotor blade of a wind turbine.

PRIOR ART

Blunt trailing edge or flat-back airfoils are examples of aerodynamic elements used in many aerodynamic applications, meeting the structural and volume requirements of these applications, such as in blended wing-body aircraft, unmanned aerial vehicles and wind turbine blades. Further modifications to flat-back airfoils are known in the art to address associated problems. One of these modifications is the usage of active flow control devices like micro-tabs, synthetic jets and micro-flaps (usually referred as smart controls). These devices are able to introduce modifications in the local flow field and help to reduce, e.g., drag. However, all of these types of solutions introduce more complexity in the airfoil. As a consequence, there is an increase in the cost of development and/or production in order to implement such solutions. Also, there is a cost in case of maintenance (especially for the actuators) and actually, already in the design phase, more expensive and complex tools are needed to design the actuators and predict their effects on, e.g., turbine performance. An alternative is for example split plates. These are plates applied in chord direction to the trailing edge of flat-back airfoils.

The publication 'Trailing Edge Modifications for Flat-back Airfoils' By C. P. van Dam et al., Sandia Report SAND2008-1781, March 2008 discloses a number of modifications provided for flat-back airfoils (or blunt trailing edge airfoils) which are applied in wind turbine blades, including a rounded trailing edge, a base cavity, a slotted/perforated cavity, a splitter plate, and a serrated trailing edge.

The article 'Drag Reduction of blunt trailing-edge airfoils' by J. P. Baker and C. P. van Dam, BBAA VI International Colloquium on Bluff Bodies Aerodynamics & Application, Milano, Italy, Jul. 20-24, 2008 discloses solutions to reduce drag of blunt trailing-edge airfoils which are applied in various aerodynamic systems, including wind turbine blades. Several embodiments of adaptations of the trailing edge of an airfoil are suggested, including a splitter plate, a base cavity using two splitter plates, and an offset cavity using two plates.

A further prior art publication is the article by Thu Thau, Li Chenb, Jiyuan Tu 'Numerical study of turbulent trailing-edge flows with base cavity effects using URANS', in Journal of Fluids and Structures, part 26, nr 7-8, pages 1155-1173. This article discloses several aerodynamic elements at the trailing edge of the aerodynamic elements. In Table 1 and 5, for example, a Squared-off Blunt (A), Triangular Cavity (B) Semi-Circular Cavity (C), and a Rectangular Cavity (D) are shown.

SUMMARY OF THE INVENTION

The present invention seeks to provide an improved design of the airfoil shape of a wing body, such as the rotor blade of a wind turbine.

According to the present invention, an aerodynamic element is provided, wherein the aerodynamic element further comprises an extension body attached to the trailing edge near the suction side surface of the aerodynamic element, wherein the extension body has a top surface flush with the suction side surface. The extension body will influence the airflow around the aerodynamic element in a positive manner, and will result in a better performance.

In a further aspect, the present invention relates to a rotor blade for a wind turbine, wherein the rotor blade is provided at least partly with an aerodynamic element according to any one of the embodiments described herein. A specific part of a rotor blade for a wind turbine is usually provided with a flat-back trailing edge to meet structural requirements. The aerodynamic element is provided in a part of the rotor blade having a flat-back trailing edge to obtain the improvements in aerodynamic behavior.

SHORT DESCRIPTION OF DRAWINGS

The present invention will be discussed in more detail below, using a number of exemplary embodiments, with reference to the attached drawings, in which.

Figure 5A:
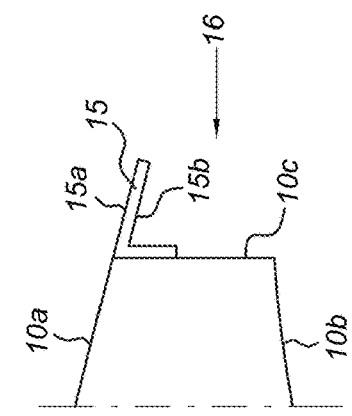
Figure 5B:
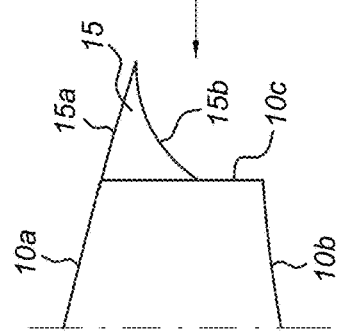
Figure 5C:
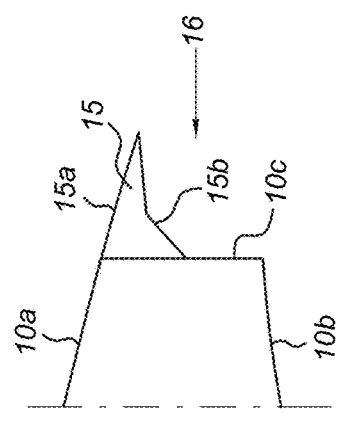
Figure 5D:
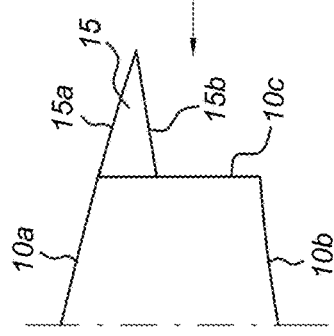
Figure 5E:
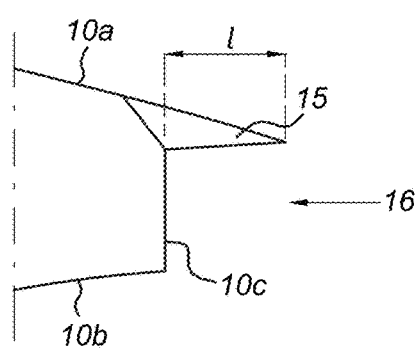
Figure 5F:
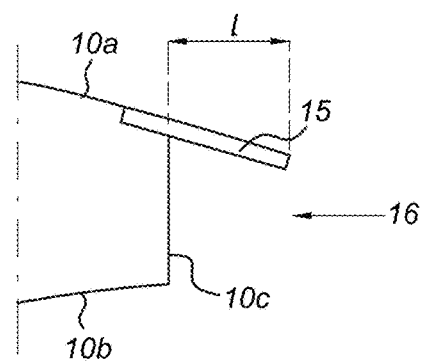
Figure 6:
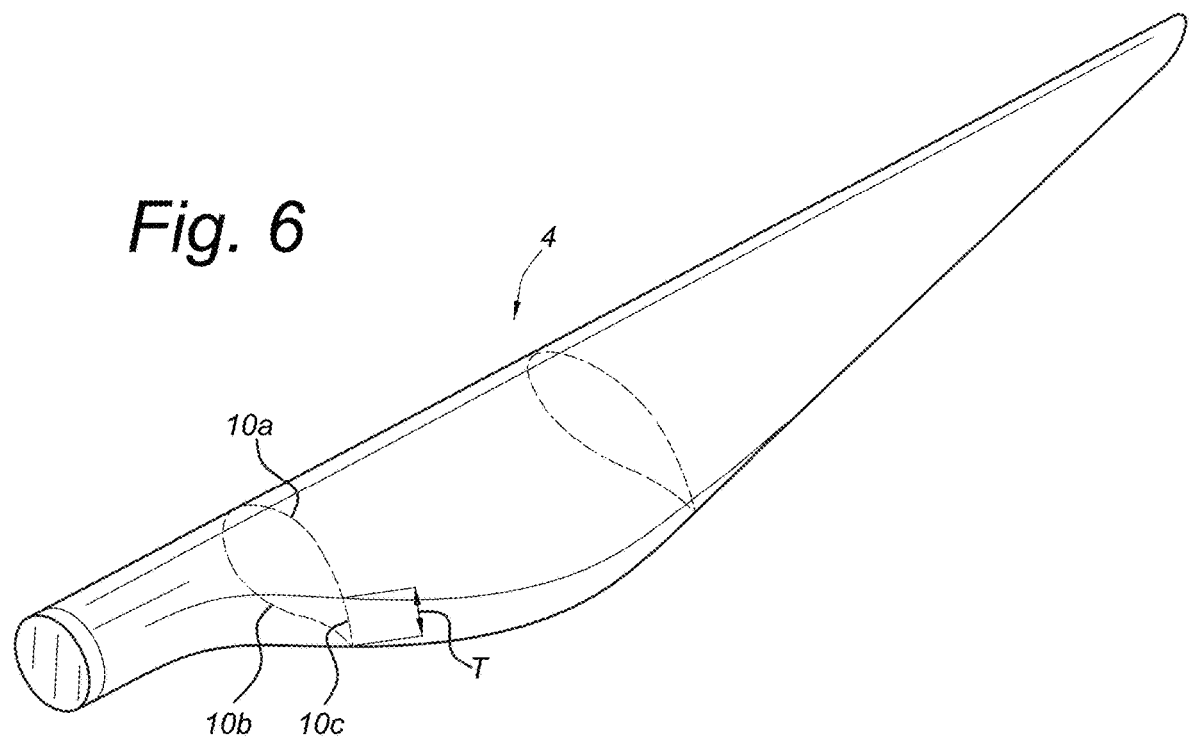

FIG. 5A-F show partial cross sectional view of further alternative embodiments of the present invention; and FIG. 6 show a perspective view of a rotor blade with a flat-back trailing edge in which the present invention embodiments may be advantageously applied.

DETAILED DESCRIPTION OF EXEMPLARY EMBODIMENTS

The root region of a wind turbine rotor blade 4, an example of which is shown in perspective view in FIG. 6, has to guarantee the structural properties of the blade, even if that would penalizing the aerodynamic performance of that part. However, with the increasing size of wind turbines, good aerodynamic characteristics at the root are desirable as well to increase the overall performance of the blade.

Flat-back thick airfoils are popular nowadays as an aerodynamic element in, e.g., wind turbine rotor blades 4 because the blunt shape of the trailing edge contributes to improve the lift performance of the airfoil and also aids in preserving its structural properties. The drawback of such solution is the increase of the base drag, flow unsteadiness and, as a consequence, the increase in noise (although the noise at the root is not the main source of noise).

Figure 1:
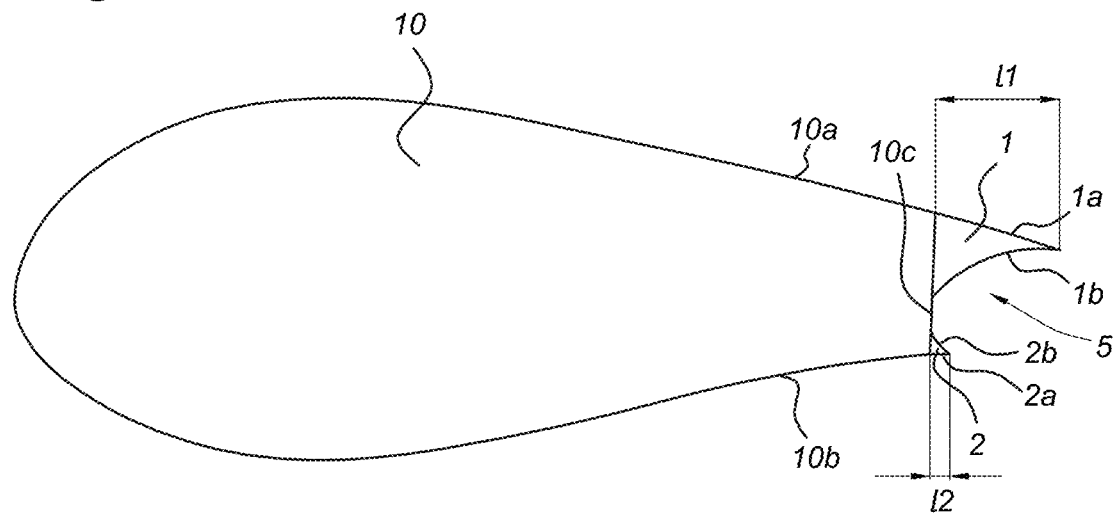
FIG. 1 shows a cross sectional view of an aerodynamic element according to a first embodiment of the present invention.

FIG. 1 shows a cross sectional view of a flat-back airfoil 10 along the airflow direction of, e.g., the wind turbine rotor blade 4 as shown in FIG. 6. The rotor blade is provided at least partly (along its length) with an aerodynamic element according to one of the present invention embodiments, e.g., in a part of the rotor blade having a flat-back trailing edge 10c. The flat-back airfoil 10 is a specific type of aerodynamic element and has an upper surface (or suction side surface) 10a and a lower surface (or pressure side surface) 10b, which are differently shaped in order to provide lift. The trailing edge 10c of the airfoil 10 is a substantially flat surface extending between the suction side surface 10a and the pressure side surface 10b.

In a group of embodiments, the flat-back airfoil 10 is furthermore provided with a first member 1 and a second member 2, which are attached to the trailing edge 10c of the airfoil 10. The first member 1 has a top surface 1a which is flush with the upper surface 10a of the airfoil 10. Similarly, the second member 2 has a bottom surface 2a which is flush with the lower surface 10b of the airfoil 10. This has the effect that the upper surface 10a of the airfoil is aerodynamically extended over a length $l_1$ of the first member 1, and that the lower surface is aerodynamically extended over a length $l_2$ of the second member 2.

In between the first and second member 1, 2, a cavity 5 is formed which influences the aerodynamic behavior of the airfoil 10. The first member 1 and second member 2 in other words form a swallow tail shaped cavity body which is fitted at the trailing edge 10c of the airfoil 10.

In an embodiment, the length $l_1$ of the first member 1 is larger than the length $l_2$ of the second member 2. Thus, in other words, a non-symmetrical profile is created by the first and second member.

As shown in the embodiment of FIG. 1, a lower surface 1b of the first member 1 is provided, which is curved. Also, an upper surface 2b of the second member 2 is provided as a curved surface.

By adopting the innovative shape, the main advantages of a flat-back airfoil 10 are kept, but at the same time, bad side-effects are reduced. Because of the non-symmetrical cavity 5, when the flow separates from the bottom surface 2a, it merges to the flow on the other side (from the upper surface 1a of the first member 1) in a "smoother" way, leading to better performance. The adapted trailing edge part of the airfoil 10 introduces a perturbation in the trailing edge flow field, leading to a reduction in noise, base drag and flow unsteadiness. No mobile or moving parts are involved in this solution, so there is less cost for installation, maintenance and production.

Figure 2:
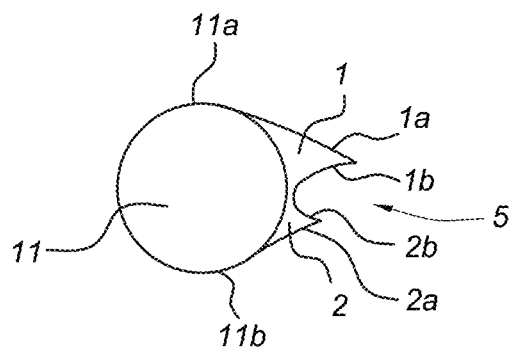
FIG. 2 shows a cross sectional view of an aerodynamic element according to a further embodiment of the present invention.

In FIG. 2 a cross sectional view is shown of an exemplary embodiment of the present invention. Here, the first and second member 1, 2 are combined as a single swallow tail shaped cavity body, and attached to a substantially circular cross sectional part 11. This circular cross sectional part 11 is, e.g., the cylindrically shaped root part of a wind turbine rotor blade closest to the hub of the wind turbine (which in many cases is circular to allow easy pitch control of the rotor blade). The aerodynamic element 11 is in this case provided in a part of the rotor blade having a substantially cylindrical cross section.

The combined first and second member 1, 2 are different from the embodiment with first member 1 and second member 2 as separate elements in the embodiment of FIG. 1 This would allow easier assembly of the first and second member 1, 2 to the trailing edge of the aerodynamic element 11.

As in the embodiment described with reference to FIG. 1, the first member 1 has a top surface 1a which is flush with an upper surface 11a of the circular part 11 (which can be seen as a specific species of possible shapes of an airfoil 10). Similarly, the second member 2 has a bottom surface 2a which is flush with the lower surface 11b of the circular part 11.

As can be seen in the cross sectional view of FIG. 2, the cavity 5 of the combined first and second member 1, 2 is a single concave shaped trailing edge surface. Concave means arched in or curved inward. The opposite of concave is convex, which means curved out or rounded outward. A concave line in an object (in this case the outer circumference of the cross section of the airfoil 10) describes a pair of points joined by a line, where not all points on the line are in the object. A convex line describes a pair of points joined by a line, where all points on the line are also in the same object.

Figure 3:
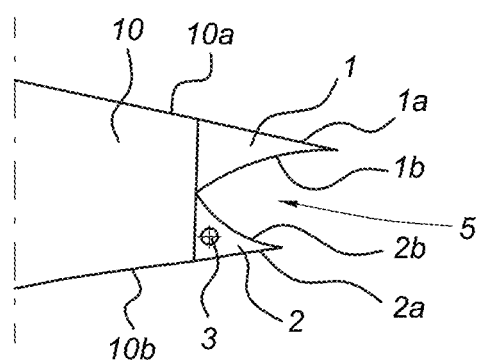
FIG. 3 shows a partial cross sectional view of an aerodynamic element according to an even further embodiment of the present invention.

In FIG. 3, a partial cross sectional view is shown of a further embodiment of an airfoil 10 provided with a first and second member 1, 2. In this embodiment, the lower surface 1b of the first member 1 and the upper surface 2b of the second member 2 form a sharp edged surface defining the cavity 5 between them. The curved surfaces 1b, 2b as shown may also be implemented as straight surfaces.

Furthermore, in this embodiment, the second member 2 is movably attached to the trailing edge surface 10c of the airfoil 10, e.g., pivotable around an axis indicated by reference numeral 3. The bottom surface 2a of the second member 2 is still held flush with a lower surface 10b of the airfoil in order to maintain a non-disturbed airflow in operation. However, the adjustable second member 2 can be used to fine tune the aerodynamic behavior of the airfoil 10 as a whole.

In an even further embodiment the adjustable second member 2 is controlled using an actuator which is operatively connected to the second member 2 for controlling the angle of the lower surface 2a of the second member 2 with respect to the lower surface 10b of the airfoil 10.

The airfoil 10 in combination with the swallow tail shaped cavity body 1, 2 as described above in various embodiment can also be seen as a new geometry for an airfoil as such. From the production point of view in particular, the shape of the trailing edge 10c of the airfoil 10 could be adapted with specific add-on implementations for the first and/or second member 1, 2, instead of designing a special mold for the entire airfoil 10, with cost benefits. Also, adaptation of existing airfoils 10 is then possible, even when already installed (e.g., as rotor blades of a wind turbine).

Figure 4:
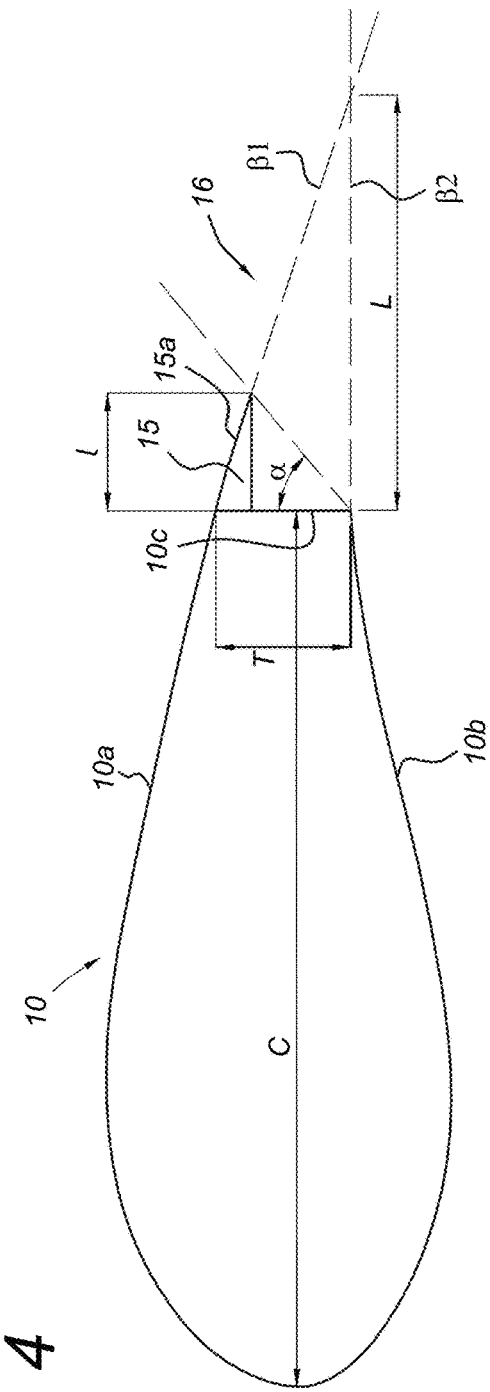
FIG. 4 shows a cross sectional view of an aerodynamic element according to a further embodiment of the present invention.

In a further group of embodiments, of which an example is shown in the cross sectional view of FIG. 4, the aerodynamic element 10 further comprises an extension body 15 attached to the trailing edge 10c near the suction side surface 10a of the aerodynamic element 10. The extension body 15 has a top surface 15a flush with the suction side surface 10a, As the top surface 15a is flush with the suction side surface 10a, the boundary layer airflow will adhere all along the suction side surface to an aft end of the extension body 15. At the pressure side surface 10b, the discontinuous surface will cause the airflow to let go early. Similar effects as described above will occur, providing advantages in performance parameters of the aerodynamic element 10, especially when applied in a rotor blade of a wind turbine.

As shown in the FIG. 4 embodiment, the extension body 15 in combination with the trailing edge 10c forms a non-symmetrical downstream facing profile surface 16. In this context, downstream indicates a back side of the aerodynamic element 10 in the sense of airflow direction during actual operational use. The extension body has a lower surface that is remote from the pressure side surface, an exposed portion of the trailing edge extending from the lower surface of the extension body to the pressure side surface of the aerodynamic element.

In the FIG. 5A-F partial cross sectional views are shown of various exemplary implementation of the extension body 15 of embodiments of the present invention aerodynamic element 10. In the FIG. 5A implementation, the extension body 15 has a straight lower surface 15b, as a result of which the profile surface 16 has two straight surfaces (yet still non-symmetric when viewed in the sense of suction side surface 10a and pressure side surface 10b of the aerodynamic profile 10). In the FIG. 5B implementation, the lower surface 15b has two parts at an angle to each other, making the profile surface 16 even more non-symmetric.

FIG. 5C shows an implementation of the extension body 15 of which the lower surface is curved, e.g., curved with a predetermined radius. FIG. 5D shows an embodiment wherein the implementation of the extension body 15 is an angled plate body, which is easy to manufacture and attach to the trailing edge 10c. It will be clear that even further alternative shapes of the lower surface 15b of the extension body 15 are conceivable, resulting in an effective profile surface 16, such as a concave surface, a straight surface, an extension body 15 with a lower surface 15b extending substantially perpendicular to the trailing edge 10c, etc.

It is noted that in analogy to the embodiments described with reference to FIG. 1-3, the extension body 15 may be enhanced with the second member 2 as shown and described with reference to these embodiments, wherein the cavity 5 then is formed in addition/alternative to the downstream facing profile surface 16.

Referring back to the embodiment shown in FIG. 4, in a further embodiment, a first tangent $\beta_1$ associated with the suction side surface 10a and a second tangent $\beta_2$ associated with the pressure side surface 10b intersect at an intersection length L downstream of the flat-back airfoil type trailing edge 10c. In this embodiment, a length l of the extension body 15 extending from the trailing edge 10c in airflow direction is less than the intersection length L. The effect is that the boundary layer airflow releases at the rim of the trailing edge 10c on the pressure side surface 10b, whereas the dimensions ensure no reattachment to the aerodynamic element 10 occurs of the airflow on the pressure side.

In an alternative embodiment, the flat-back airfoil type trailing edge 10c has an end thickness T as shown, and a length l of the extension body in airflow direction is less than the end thickness T.

In an even further variant of definition of the relevant dimensions of the aerodynamic element 10, a length l of the extension body in airflow direction fulfils the equation:

$$l \leq T \tan \alpha,$$

wherein T is an end thickness of the trailing edge 10c perpendicular to the airflow direction, and a is an angle between a pressure side end of the trailing edge 10c and an end (rim) of the extension body 15. The angle $\alpha$ is selected in the range between 10° and parallel to the second tangent $\beta_2$ associated with the pressure side surface 10b. The range of the angle $\alpha$ is, e.g., between 10° and 80°, e.g., between 20° and 60°, or between 30° and 45°.

As shown in the embodiment of FIG. 4 (and in the embodiment of FIG. 1), the trailing edge 10c is located at beyond 50% of a chord length C of the aerodynamic element 10. This ensures that the asymmetry created by the present invention profiles is located in the aft part of the aerodynamic element 10, thus having little or no influence on further relevant aerodynamic parameters.

It is noted that in the embodiments described with reference to FIG. 4-5F, an alternative arrangement may be provided wherein the extension body 15 is movably attached to the trailing edge 10c of the aerodynamic element 10 (in analogy to the FIG. 3 embodiment described above). This may be used to actively fine tune aerodynamic behavior of the aerodynamic element 10 during actual operation. In an even further embodiment, the aerodynamic element 10 comprises an actuator operatively connected to the extension body 15 for controlling the angle of the top surface 15a of the extension body 15 with respect to the suction side surface 10a of the aerodynamic element 10.

The partial cross section views of FIGS. 5E and 5F show further alternatives of the present invention embodiments, wherein the extension body 15 has a slightly different shape to allow easy attachment thereof to the trailing edge 10c of the aerodynamic element 10. The embodiment of FIG. 5E shows an extension body with a triangular shaped cross section. The suction side surface 10a is modified with a cut-out near the trailing edge 10c allowing to attach the extension body 15 to the aerodynamic element 10 with a larger contact area (when compared to the embodiment shown in FIG. 5A), allowing a better fixation (e.g., using a glue connection. As shown in FIG. 5E, the relevant parameter of the extension body 15 is the length l extending beyond the trailing edge 10c. In the embodiment of FIG. 5F, the extension body 15 has the shape of an elongated, thin beam, attached to a rectangular recession provided where the suction side surface 10a and trailing edge 10c meet.

As described above, the present invention embodiments can be advantageously applied in rotor blade 4 designs. In a further aspect, the present invention embodiments thus encompass a rotor blade 4 for a wind turbine, wherein the rotor blade 4 is provided at least partly with an aerodynamic element 10 having a cross section in an airflow direction with a suction side surface 10a, a pressure side surface 10b, and a trailing edge 10c of a flat-back airfoil type extending between the suction side surface 10a and the pressure side surface 10c. The aerodynamic element 10 then further comprises an extension body 15 attached to the trailing edge 10c near the suction side surface 10a of the aerodynamic element 10, and the extension body 15 has a top surface 15a flush with the suction side surface 10a, This group of implementations of an extension body 15 is shown with reference to FIG. 4-5F. As an alternative, a rotor blade 4 is provided wherein the extension body is a swallow tail shaped cavity body which comprises a first member 1 having a top surface 1a flush with an upper surface 10a of the aerodynamic element 10, and a second member 2 having a bottom surface 2a flush with a lower surface 10b of the aerodynamic element 10. The first member 1 and second member 2 further form a cavity 5 between them, and the cavity 5 has a non-symmetrical profile. This group of implementations of the extension body are shown in FIG. 1-3.

As shown in the exemplary embodiment of a rotor blade 4 having a flat-back airfoil type of trailing edge 10c along part of its length, the exact cross sectional shape of the rotor blade will change over its length, allowing modification using the present invention embodiments in a precise and localized manner.

In a specific group of embodiments, the extension body 15 extends over a limited length of the trailing edge 10c of the aerodynamic element 10, e.g., the inner third in case of a wind turbine rotor blade 4 as shown in the exemplary embodiment of FIG. 6.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. A rotor blade for a wind turbine,
wherein the rotor blade is provided at least partly with an aerodynamic element comprising a cross section in an airflow direction with a suction side surface, a pressure side surface, and a trailing edge of a flat-back airfoil type extending between the suction side surface and the pressure side surface,
wherein the aerodynamic element further comprises an extension body attached to the trailing edge near the suction side surface of the aerodynamic element,
wherein the extension body has a top surface flush with the suction side surface and a lower surface that is remote from the pressure side surface, an exposed portion of the trailing edge extending from the lower surface of the extension body to the pressure side surface of the aerodynamic element,
wherein a first tangent is tangent to the top surface of the extension body and a second tangent is tangent to the pressure side surface at the endmost part of the trailing edge, the endmost part of the trailing edge being the endmost part of the rotor blade,
wherein the first and second tangents intersect at an intersection length downstream of the trailing edge,
wherein a length of the extension body extending from the trailing edge in the airflow direction is less than the intersection length, and
wherein the trailing edge has an end thickness T, and wherein the length l of the extension body in the airflow direction is less than the end thickness T.

2. The rotor blade of claim 1, wherein the extension body in combination with the trailing edge forms a non-symmetrical downstream facing profile surface.

3. The rotor blade of claim 1, wherein the length l of the extension body in the airflow direction fulfils the equation $$l \leq T \tan \alpha,$$

wherein the thickness T of the trailing edge is perpendicular to the airflow direction, and α is an angle between a pressure side end of the trailing edge and an end rim of the extension body, the angle α being in the range between 0° and 90°.

4. The rotor blade of claim 1, wherein the trailing edge is located at beyond 50% of a chord length of the aerodynamic element.

5. The rotor blade of claim 1, wherein the extension body is movably attached to the trailing edge of the aerodynamic element.

6. The rotor blade of claim 1, further comprising an actuator operatively connected to the extension body for controlling the angle of a suction side surface of the extension body with respect to the suction surface of the aerodynamic element.

7. The rotor blade of claim 1, wherein the extension body extends over a limited length of the trailing edge of the aerodynamic element.

* * * * *